(12) United States Patent
Zimmermann et al.

(10) Patent No.: US 7,554,484 B2
(45) Date of Patent: Jun. 30, 2009

(54) OBJECT DETECTION SYSTEM

(75) Inventors: Uwe Zimmermann, Ludwigsburg (DE); Achim Pruksch, Neudenau (DE); Werner Uhler, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 32 days.

(21) Appl. No.: 10/563,990

(22) PCT Filed: Feb. 22, 2001

(86) PCT No.: PCT/DE01/00678

§ 371 (c)(1),
(2), (4) Date: Apr. 11, 2007

(87) PCT Pub. No.: WO01/67131

PCT Pub. Date: Sep. 13, 2001

(65) Prior Publication Data

US 2007/0205938 A1    Sep. 6, 2007

(30) Foreign Application Priority Data

Mar. 8, 2000  (DE) .............................. 100 11 263

(51) Int. Cl.
*G01S 13/00* (2006.01)
(52) U.S. Cl. .......................................... 342/70; 342/59
(58) Field of Classification Search ................. 342/52, 342/59, 70–72; 701/117, 205, 207
See application file for complete search history.

(56) References Cited

U.S. PATENT DOCUMENTS

| | | | | |
|---|---|---|---|---|
| 3,493,920 A | * | 2/1970 | MacMunn | 367/96 |
| 5,475,494 A | * | 12/1995 | Nishida et al. | 356/4.01 |
| 5,485,155 A | * | 1/1996 | Hibino | 342/70 |
| 5,572,484 A | * | 11/1996 | Gaus et al. | 367/99 |
| 5,612,686 A | * | 3/1997 | Takano et al. | 340/903 |
| 5,617,085 A | * | 4/1997 | Tsutsumi et al. | 340/903 |
| 5,670,962 A | * | 9/1997 | Henderson et al. | 342/70 |
| 5,754,123 A | * | 5/1998 | Nashif et al. | 340/903 |
| 5,933,109 A | * | 8/1999 | Tohya et al. | 342/175 |
| 5,949,331 A | * | 9/1999 | Schofield et al. | 340/461 |
| 6,055,042 A | * | 4/2000 | Sarangapani | 356/4.01 |
| 6,191,704 B1 | * | 2/2001 | Takenaga et al. | 340/903 |
| 6,509,863 B2 | * | 1/2003 | Zoratti et al. | 342/70 |
| 6,580,385 B1 | * | 6/2003 | Winner et al. | 342/70 |

FOREIGN PATENT DOCUMENTS

| | | |
|---|---|---|
| DE | 195 01 612 | 7/1996 |
| EP | 0 775 921 | 5/1997 |
| EP | 0903 714 | 3/1999 |
| EP | 0 915 350 | 5/1999 |
| GB | 2279841 | 1/1995 |
| WO | 00 73818 | 12/2000 |

* cited by examiner

*Primary Examiner*—Thomas H Tarcza
*Assistant Examiner*—Peter M Bythrow
(74) *Attorney, Agent, or Firm*—Kenyon & Kenyon LLP

(57) ABSTRACT

An object detection system, in particular for a motor vehicle, has multiple object detectors and/or operating modes with which different detection ranges and/or detection zones are detected. In this case, an object detector is preferably a radar sensor which has a relatively large detection range with a relatively small angular detection zone in a first operating mode and has a detection range that is small relative to the first with an enlarged angular detection zone in a second operating mode.

4 Claims, 1 Drawing Sheet

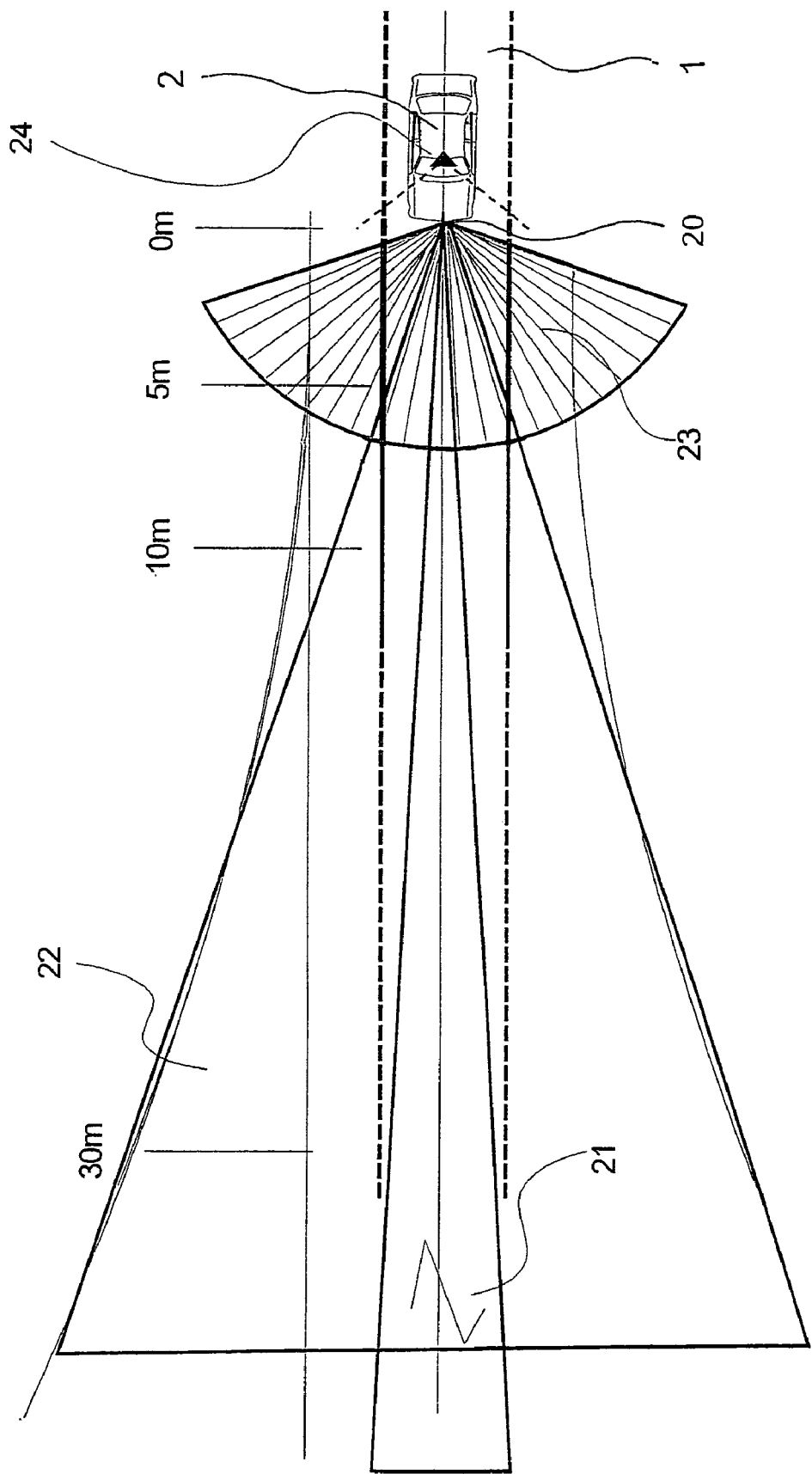

OBJECT DETECTION SYSTEM

FIELD OF THE INVENTION

The present invention relates to an object detection system, in particular for a motor vehicle.

BACKGROUND INFORMATION

Such a system may be used, for example, as part of an adaptive cruise control in a motor vehicle. Such a control can regulate a previously set driving speed and/or a previously set distance from a vehicle in front or from objects in the direction of travel without intervention by the driver. This is done with appropriate regard for the environment around the motor vehicle and optionally additional parameters such as visibility and weather conditions. Such a control is known as an adaptive cruise control system (ACC system). The ACC system must be flexible enough to react appropriately to all driving situations, especially in view of today's growing traffic density. This in turn requires an appropriate object detection sensor system to supply the measured data required for control purposes in all driving situations.

Sensors for a freeway-capable ACC system, as a rule having radar or lidar sensors, which have a range of approximately 100 to 150 m with a detection angle of approximately 10° are known per se. Furthermore, short range distance sensors for parking aid systems which are predominantly equipped with ultrasonic sensors are also known per se.

German Patent Application No. 196 22 777 describes a sensor system for automatic determination of the relative position between two objects. This sensor system has a combination of an angle-dependent sensor and an angle-independent sensor. The sensor which does not have angle resolution and is thus independent of angle is designed as a sensor that analyzes the distance from an object on the basis of a transit time measurement. Possible sensors include RADAR, LIDAR or ultrasonic sensors. The angle-dependent sensor has a geometric arrangement of optoelectronic transmitters and receivers arranged in the form of photoelectric barriers. The sensors, both of which cover a common detection zone, are arranged in close spatial proximity. To determine the relative position of an object, the distance from the object is determined by the angle-independent sensor, and the angle to the object is determined by the sensor having angle resolution. The relative position is known on the basis of the distance from and the angle to the object. As an alternative to this arrangement of optoelectronic transmitters and receivers, the use of two sensors is proposed, which jointly determine the angle to the object by the triangulation principle.

Furthermore, an object detection system is also described in German Patent Application No. 196 16 038 in which an optical transmitter for a light beam having a variable transmission angle, and an optical receiver with angle resolution are also present. The transmitted light beam is modulated in this case in such a way that the position of the object within the angular range of the transmitted light beam can also be established up to a specific distance from the phase difference of the transmitted light beam and the received light beam.

In another object detection system described in German Patent Application No. 42 42 700, the detection of objects, particularly those a relatively large distance ahead of a vehicle, from a vehicle is made possible with a microwave radar sensor. This radar sensor is also a component of the vehicle safety system described above, in which information about the distance and the relative speed of the motor vehicle with respect to the vehicles ahead within a preset angular range, which is, however, restricted, is continuously processed.

SUMMARY OF THE INVENTION

An object detection system according to the present invention, in particular for a motor vehicle, has multiple object detectors and/or operating modes with which different detection ranges and/or detection zones are detected. Preferably, an object detector according to the present invention is a radar sensor which has a relatively large detection range with a relatively small angular detection zone in a first operating mode and has a detection range that is small relative to the first with an enlarged angular detection zone in a second operating mode or an expanded first operating mode.

With the present invention, an advantageous sensor concept for the ACC system initially described can be implemented which makes it capable of detecting all of the vehicles in front of the vehicle equipped with the ACC system in its own lane as well as in the lanes neighboring on the right and left up to a preset maximum distance. The second operating mode with the relatively small range can cover, for example, a short range of up to approximately 30 to 40 m up to a minimum curve radius of approximately 100 m in this case.

The microwave distant-range radar known per se from the related art initially described operates, for example, in a frequency range of 77 GHz and is suitable for detecting objects up to 150 meters in front of the ACC vehicle in an angular detection zone of approximately 10°. These radar sensors can be expanded in such a way that in the additional operating mode they allow the expanded angular detection zone with reduced range for detecting the short range. Alternatively, these radar sensors can also be implemented in such a way that they have an expanded angular detection zone in the short range in their standard form.

The object detection system according to the present invention further includes an ultra short-range sensor which has an even smaller detection range and a large angular detection zone relative to the previously described radar sensor. The radar sensor first described is thus combined with a distance sensor which detects the objects directly in front of the vehicle equipped with the ACC system in the ultra short range of approximately 0 to 7 meters. The ultra short-range sensor has an angular detection width which covers both the width of the vehicle and parts of the neighboring right and left lanes of the roadway.

The ultra short-range sensor can preferably be an optical sensor known per se from the related art initially described, an ultrasonic sensor, or a radar sensor, e.g., in the 24 GHz range, which, for example, is already used in vehicles as a parking aid.

The object detection system according to the present invention can also include, as an additional object detector, a video device for reliable lane assignment and classification of the detected objects on the roadway. Such a video device can preferably be implemented as a stereoscopic camera or as a CMOS camera.

BRIEF DESCRIPTION OF THE DRAWING

The FIGURE shows a schematic view of the detection zones of a vehicle equipped with an ACC system.

DETAILED DESCRIPTION

The FIGURE schematically shows a multilane roadway 1, on which a vehicle 2 is located having an object detection system 20, which is a component of an ACC system initially described.

Object detection system 20 includes a radar sensor, which detects a relatively far-reaching detection zone 21 of up to approximately 150 meters in a first operating mode (ACC radar), which covers an angular zone of approximately 8° in this case, and is therefore suitable for a cruise control system. With this cruise control system, distance control of motor vehicle 2 to vehicles in front of it, not shown here, can then also be implemented. In a second operating mode (short-range radar) a second detection zone 22 is detected which reaches up to approximately 30 to 40 m and includes an angular zone of approximately 35°.

Furthermore, an ultra short-range sensor is present in object detection system 20 which reaches up to a distance zone 23 of approximately 7 meters and in this case detects an angular zone of up to approximately 52°. In addition, a video device 24 is fitted to motor vehicle 2 which can perform a lane assignment and, possibly, also an object classification in the roadway area, but does not have to be included in the core functions of the basic system. Such a video device can preferably be implemented as a stereoscopic camera or as a CMOS camera.

With object detection system 20 according to the exemplary embodiment shown in the FIGURE, an ACC system can thus be implemented which allows it to completely detect all objects in front of vehicle 2 located in its lane and in the neighboring left and right lanes up to a preset maximum distance.

It is possible with the exemplary embodiment of the present invention described, in addition to acting as the distance and/or speed control and parking aid for vehicle 2, to take into account the stop-and-go functionality on roadway 1 with object detection system 20. With this it is possible for the speed control to occur between standstill and the maximum speed of the vehicle.

What is claimed is:

1. An objection detection system comprising:
    a microwave radar sensor having a first detection range and a first angular detection zone in a first operating mode, and having a second detection range and a second angular detection zone in a second operating mode, wherein the first detection range is larger than the second detection range, and wherein the first angular detection zone is smaller than the second angular detection zone; and
    an ultra short-range sensor having a smaller detection range than the second detection range and a larger angular detection zone than the second angular detection zone, wherein the ultra short-range sensor is one of an optical sensor and a radar sensor.

2. The object detection system according to claim 1, further comprising an additional object detector, the additional object detector being a video device for lane detection and classification of detected objects.

3. The object detection system according to claim 2, wherein the video device is one of a stereoscopic camera and a CMOS camera.

4. The object detection system according to claim 1, wherein the object detection system is for a motor vehicle.

* * * * *